(12) United States Patent
Ohnishi (10) Patent No.: US 6,532,827 B1
(45) Date of Patent: Mar. 18, 2003

(54) CLAMP-ON ULTRASONIC FLOWMETER

(76) Inventor: Kazumasa Ohnishi, 121-35, Hanazonohigashi 2-chome, Nagaoka (JP), 940-0846

( * ) Notice: Subject to any disclaimer, the term of this patent is extended or adjusted under 35 U.S.C. 154(b) by 0 days.

(21) Appl. No.: 10/041,504

(22) Filed: Jan. 10, 2002

(30) Foreign Application Priority Data

Sep. 6, 2001 (JP) ........................................ 2001-270305

(51) Int. Cl.[7] .................................................. G01F 1/66
(52) U.S. Cl. ................................................... 73/861.27
(58) Field of Search ........................ 73/861.26, 861.27, 73/861.28, 861.04; 310/334

(56) References Cited

U.S. PATENT DOCUMENTS

| | | | |
|---|---|---|---|
| 4,598,593 A | * | 7/1986 | Sheen et al. ............. 73/861.04 |
| 5,214,343 A | * | 5/1993 | Baumoel ..................... 310/334 |
| 5,856,622 A | * | 1/1999 | Yamamoto et al. ...... 73/861.28 |
| 6,293,156 B1 | * | 9/2001 | Shen et al. ............... 73/861.26 |

* cited by examiner

*Primary Examiner*—Hezron Williams
*Assistant Examiner*—Jewel V. Thompson
(74) *Attorney, Agent, or Firm*—Nixon Peabody LLP; Jeffrey L. Costellia

(57) ABSTRACT

A clamp-on ultrasonic flowmeter has a pair of ultrasonic transmitting-receiving devices. Each device is composed of a ultrasonic propagating element in the form of wedge having a bottom surface and a slanting surface extending from one edge of the bottom surface at an acute angle, and a ultrasonic transducer attached on the slanting surface. The ultrasonic propagating element is composed of a plurality of sheet units in which each sheet unit is composed of plural high modulus fibers aligned in parallel in resinous material, whereby propagating ultrasonic wave emitted by the ultrasonic transducer onto the bottom surface at an angle perpendicular to the slanting surface.

27 Claims, 8 Drawing Sheets

CLAMP-ON ULTRASONIC FLOWMETER

FIELD OF THE INVENTION

The invention relates to a clamp-on ultrasonic flowmeter, a flow rate-measuring structure, and a ultrasonic transmitting-receiving device.

BACKGROUND OF THE INVENTION

The clamp-on ultrasonic flowmeter is attached to a outer surface of a pipe in which a fluid flows, for measuring from outside of the pipe a volume of the fluid flowing inside of the pipe. The clamp-on ultrasonic flowmeters are generally classified into two types. One utilizes a difference of propagating rates, and another utilizes the Doppler effect.

In the mode utilizing a difference of propagating rates, a pair of ultrasonic waves are propagated under such condition that one ultrasonic wave is propagated downstream to cross the stream of fluid while another ultrasonic wave is propagated upstream to cross the stream of fluid. Then, the time required for propagating the downstream ultrasonic wave between the predetermined distance and the time required for propagating the upstream ultrasonic wave between the same distance are compared to determine the flow rate.

In the mode utilizing the Doppler effect, the flow rate is determined by measuring a rate of particle or babble flowing with the fluid, under assumption that the particle or babble moves at a rate equal to that of the moving fluid. The moving rate of the particle or babble can be determined, by detecting variation of ultrasonic frequency from that of ultrasonic wave applied to the moving particle or babble to that of ultrasonic wave reflected to the moving particle or babble.

Figure 11:
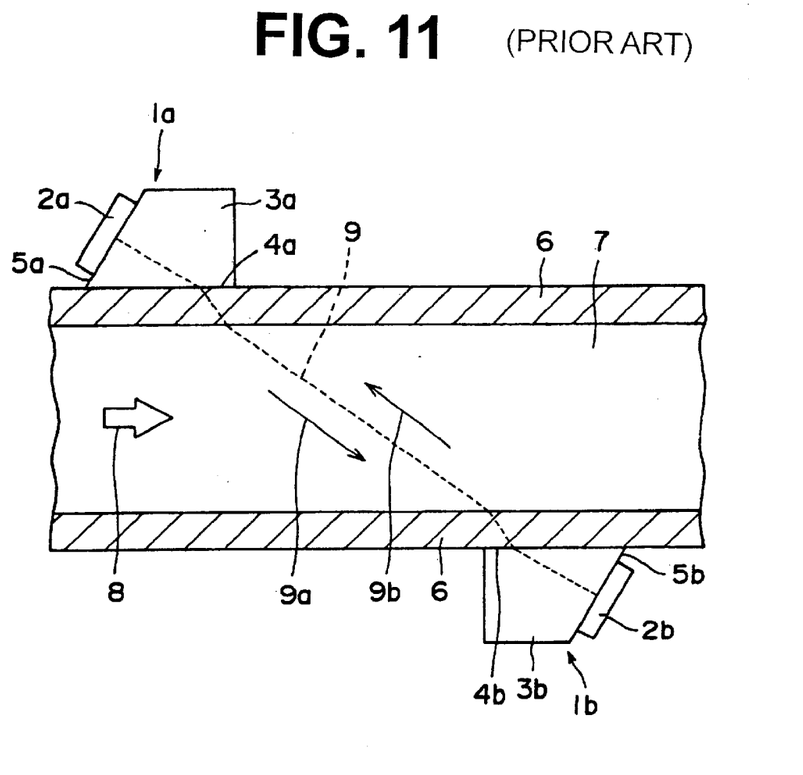
FIG. 11 shows a section of the conventional clamp-on ultrasonic flowmeter.

A representative constitution of a known clamp-on ultrasonic flowmeter is illustrated in FIG. 11 in the form of a sectional view. The clamp-on ultrasonic flowmeter of FIG. 11 utilizes a difference of propagating rates of ultrasonic wave. The clamp-on ultrasonic flowmeter is composed of a pair of ultrasonic transmitting-receiving devices 1a, 1b. The ultrasonic transmitting-receiving device 1a is composed of a ultrasonic transducer 2a and a ultrasonic propagating element in the form of wedge 3a. The ultrasonic propagating element 3a has a bottom surface 4a and a slanting surface 5a extending from one edge of the bottom surface 4a at an acute angle. The ultrasonic transducer 2a is attached on the slanting surface 5a. The ultrasonic transducer 2a has an electrode (not shown) and a lead line (not shown) on the side facing the propagating element 3a and on another side. The combination of the electrode and lead line serves to apply electric voltage to the transducer 2a. In the same way, the ultrasonic transmitting-receiving device 1b is composed of a ultrasonic propagating element 3b having a slanting surface 5b on which the ultrasonic transducer 2b is attached.

Each of the ultrasonic transducers 2a, 2b transmits ultrasonic wave to the ultrasonic propagating element when an electric voltage is applied thereto, while it produces an electric voltage when it receives ultrasonic wave. Accordingly, the ultrasonic transmitting-receiving device 1a, 1b equipped with a ultrasonic transducer functions as a transmitter and a receiver. The ultrasonic transmitting-receiving devices 1a, 1b are provided on a pipe 6 in such manner that the ultrasonic waves transmitted by the devices 1a, 1b propagate across the fluid 7 which flows inside of the pipe in the direction indicated by arrow 8, that is, on the route 9 (indicated by a dotted line) in the directions indicated in FIG. 11 by arrows 9a, 9b.

The flow rate of the fluid 7 flowing inside of the pipe 6 is determined by the following method. First, a voltage pulse is applied to the ultrasonic transducer 2a of the ultrasonic transmitting-receiving device 1a, so as to transmit a ultrasonic wave. The ultrasonic wave propagates in the ultrasonic propagating element 3a, a wall of pipe 6, fluid 7, a wall of pipe 6 on the opposite side, and ultrasonic propagating element 3b on the route indicated in FIG. 11 by the dotted line 9. Subsequently, the ultrasonic wave is received by the ultrasonic transducer 2b of the ultrasonic transmitting-receiving device 1b, to output a voltage signal. A period of time ( $T_1$ ) from the time when the ultrasonic wave is transmitted by the ultrasonic transmitting-receiving device 1a to the time when the ultrasonic wave is received by the ultrasonic transmitting-receiving device 1b is detected. Subsequently, a voltage pulse is applied to the ultrasonic transducer 2b of the ultrasonic transmitting-receiving device 1b, so as to transmit a ultrasonic wave. The ultrasonic wave is then propagate on the same route, but in the opposite direction, and the ultrasonic transducer 2a of the ultrasonic transmitting-receiving device 1a receives the propagated ultrasonic wave. A period of time ($T_2$) from the time when the ultrasonic wave is transmitted by the ultrasonic transmitting-receiving device 1b to the time when the ultrasonic wave is received by the ultrasonic transmitting-receiving device 1a is detected.

The period of time ($T_1$) required for the propagation of ultrasonic wave from the device 1a to the device 1b along the arrow 9a differs from the period of time ($T_2$) required for the propagation of ultrasonic wave from the device 1b to the device 1a along the arrow 9b. The period of time ($T_1$) is shorter than a period of time required for propagating ultrasonic wave in still water because the ultrasonic wave from the device 1a to the device 1b is propagated at an increased rate by the aid of the flowing fluid, while the period of time ($T_2$) is longer than a period of time required for propagating ultrasonic wave in still water because the ultrasonic wave is propagated from the device 1b to the device 1a against the stream of the fluid. Thus, the difference of the propagation period ($T_2$–$T_1$) is relative to the rate of movement of the flowing fluid 7. Therefore, the rate of movement of the flowing fluid is calculated from the difference of propagation period. The flow rate of the fluid 7 is then determined from the difference of propagation period and the sectional area of the inside of the pipe 6.

Thus, the clamp-on ultrasonic flowmeter is advantageous in that it can determine the flow rate with no direct contact with the flowing fluid. In order to employ the clamp-on ultrasonic flowmeter more advantageously, however, a study should be made on the clamp-on ultrasonic flowmeter for increasing the measuring sensitivity. One main point for increasing the measuring sensitivity of the clamp-on ultrasonic flowmeter resides in the improvement of directivity of ultrasonic wave transmitted by a ultrasonic transmitting-receiving device. Since the dimensions of the ultrasonic transducer used for the ultrasonic transmitting-receiving device are finite, the ultrasonic wave transmitted by the ultrasonic transducer does not form a plane wave with complete directivity but a plane wave with some diffused wave. Thus, a ultrasonic wave transmitted by the transmitting-receiving device necessarily contains a diffused ultrasonic wave portion deviated from the direction of propagation of the target ultrasonic wave (i.e., direction perpendicular to the vibrating surface of the ultrasonic transducer). The diffused ultrasonic wave portion cannot be received by the receiving device, and hence the measuring sensitivity decreases. Even if the diffused ultrasonic wave portion is received by the receiving device, the diffused ultrasonic wave portion having a phase deviated from the target ultrasonic wave produces irregular waveform in the signal wave. The production of irregular waveform also causes decrease of sensitivity.

Japanese Patent Provisional Publication H7-284198 describes directivity of ultrasonic wave transmitted by a ultrasonic transducer is improved by employing a combination of the ultrasonic transducer and a fiber-reinforced resinous material. In more detail, the publication describes that in the combined ultrasonic transducer and fiber-reinforced resinous material, a vibration in the longitudinal direction of the fiber is suppressed and therefore a vibration perpendicular to the fiber is enhanced, whereby the directivity of ultrasonic wave is improved. The publication suggests that the combined ultrasonic transducer and fiber-reinforced resinous material can be utilized in a flowmeter.

Figure 12:
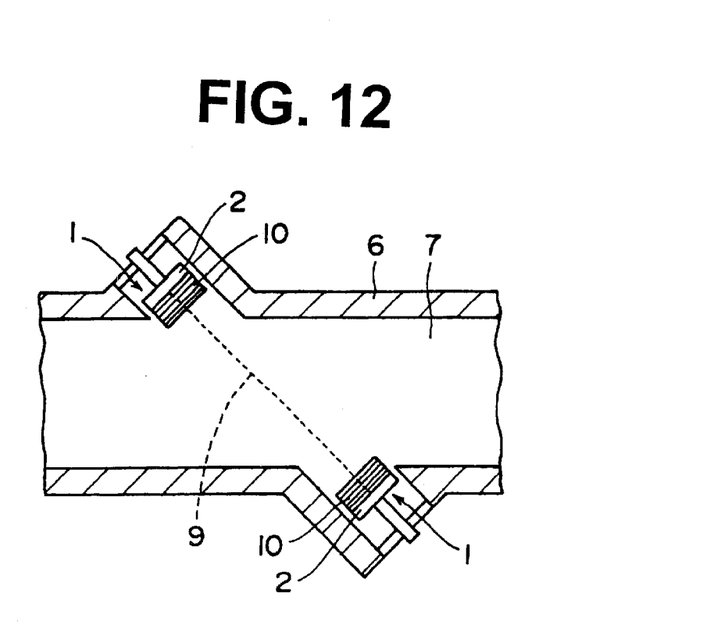
FIG. 12 shows a section of a sensor-inserted ultrasonic flowmeter which is manufactured using fiber-reinforced resinous material.

In view of the teaching given in the Japanese Patent Provisional Publication H7-284198, the present inventor manufactured a combined ultrasonic transducer 2 and fiber-reinforced resinous material 10 and further manufactured a pair of sensor-immersed ultrasonic flowmeters 1, as shown in FIG. 12. It is then confirmed that the sensor-immersed ultrasonic flowmeter 1 is effective to determine a flow rate of a fluid at a high sensitivity.

Figure 13:
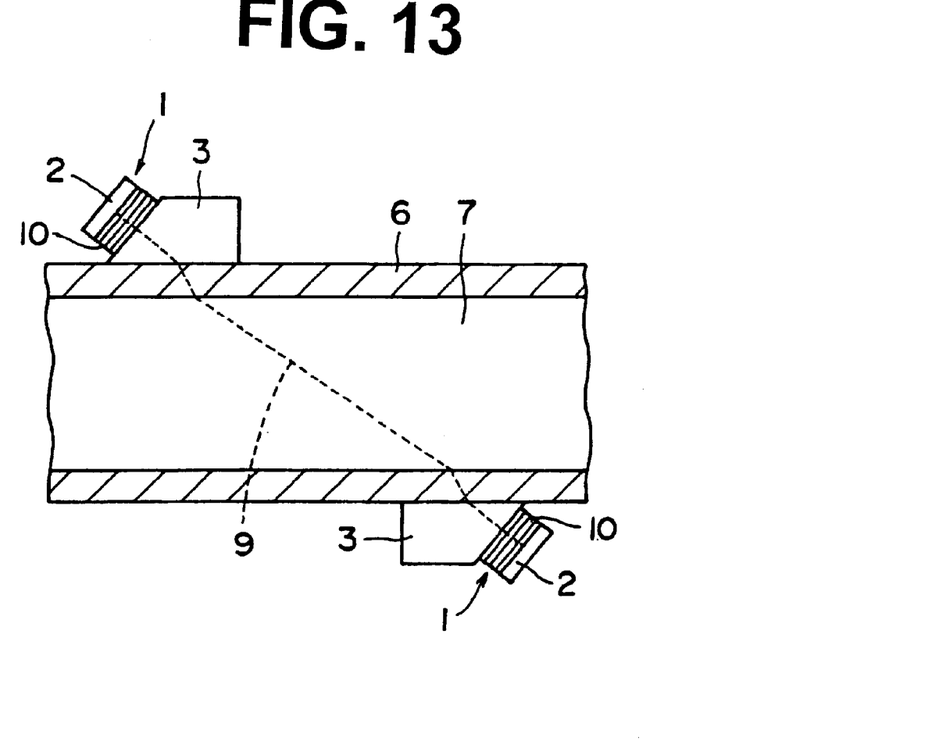
FIG. 13 shows a section of a clamp-on ultrasonic flowmeter which is manufactured using fiber-reinforced resinous material.

Then, the inventor manufactured a clamp-on ultrasonic flowmeter 1 by attaching the combination of ultrasonic transducer 1 and fiber-reinforced resinous material 10 to a conventional ultrasonic propagating element in the form of wedge, as shown in FIG. 13. He expected that the clamp-on ultrasonic flowmeter 1 of FIG. 13 shows an increased directivity of ultrasonic wave and an improved sensitivity. However, it was found that the sensitivity is not noticeably improved, contrary to his expectation.

SUMMARY OF THE INVENTION

Accordingly, the present invention has an object to provide a clamp-on ultrasonic flowmeter giving an improved high sensitivity.

The invention has another object to provide a flow rate-measuring structure giving an improved high sensitivity.

The invention has a further object to provide a new ultrasonic transmitting-receiving device.

The present inventor has studied further for improving the sensitivity of a clamp-on ultrasonic flowmeter utilizing fiber-reinforced resinous material, from the viewpoints of directivity and strength of ultrasonic wave transmitted by a ultrasonic transmitting-receiving device. As a result of the study, the present inventor has discovered that the ultrasonic wave having improved directivity which is produced by the combination of the ultrasonic transducer and the fiber-reinforced resinous material is reduced in its strength of ultrasonic wave and is varied in its waveform within the ultrasonic propagating element in the form of wedge.

The reduction of strength (i.e., attenuation) of ultrasonic wave and the variation of ultrasonic waveform are considered to be caused by conversion of a portion of the ultrasonic wave (i.e., highly directed longitudinal wave transmitted by the combination of ultrasonic transducer and the fiber-reinforced resinous material) into a traverse wave when the ultrasonic wave is propagated within the ultrasonic transmitting-receiving device. The generation of the traverse wave causes decrease of the normal ultrasonic wave which propagates in the direction perpendicular to the vibrating surface of the ultrasonic transducer. Further, the generated traverse wave overlaps with the normal ultrasonic wave to cause the variation of the target ultrasonic waveform.

Then, the present inventor has discovered that the ultrasonic wave transmitted by the ultrasonic transducer can be propagated within a ultrasonic propagating device, keeping its high directivity and giving almost no attenuation when the ultrasonic propagating device per se is produced by fiber-reinforced resinous material having a plurality of well aligned high modulus fibers, and that a clamp-on ultrasonic flowmeter having such constitution shows prominently high sensitivity as compared with that of the conventional clamp-on ultrasonic flowmeter.

Accordingly, the present invention resides in a clamp-on ultrasonic flowmeter comprising a pair of ultrasonic transmitting-receiving devices, each comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

The invention also resides in a flow rate-measuring structure comprising a pipe in which a fluid flows and a pair of ultrasonic transmitting-receiving devices arranged on the pipe on an outer surface thereof, each transmitting-receiving device comprising a ultrasonic propagating element in the form of wedge having a bottom surface and a slanting surface extending from one edge of the bottom surface at an acute angle, and a ultrasonic transducer provided on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

The invention further resides in a ultrasonic transmitting-receiving device comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

In the invention, the following embodiments are preferred.

(1) The sheet units of the ultrasonic propagating element are produced under the condition that the high modulus fibers in one sheet unit are arranged to make a right angle with the high modulus fibers in an adjoining sheet unit.

(2) The high modulus fiber has a tensile modulus of higher than 50 GPa.

(3) The high modulus fiber is carbon fiber.

(4) An elastic material sheet is attached to the bottom surface of the ultrasonic propagating element.

(5) The elastic material sheet has a convex surface (U-shaped surface) on the side not facing the propagating element.

(6) The elastic material sheet has a rate of sonic wave propagation in the range of 1,000 to 2,000 m/sec.

(7) The elastic material sheet is made of polyurethane gel.

(8) A pair of the ultrasonic transmitting-receiving devices are linearly arranged in a long case having one or more openings on a bottom thereof under the condition that the slanting surfaces on each of which the ultrasonic transducer is attached do not face each other.

(9) The pair of the ultrasonic transmitting-receiving devices are arranged under the condition that each of the transmitting-receiving device is able to move on the opening to change a distance between the transmitting-receiving devices.

(10) The pipe of the flow rate-measuring structure is made of metal such as iron.

(11) The pipe of the flow rate-measuring structure is made of polymeric material such as polyvinyl chloride.

BRIEF DESCRIPTION OF THE DRAWING

FIGS. 3-(a) and -(b) indicate representative sizes of the ultrasonic transmitting-receiving device of FIG. 2.

DETAILED DESCRIPTION OF THE INVENTION

The present invention is further described by referring to the figures given in the attached drawings.

Figure 1:
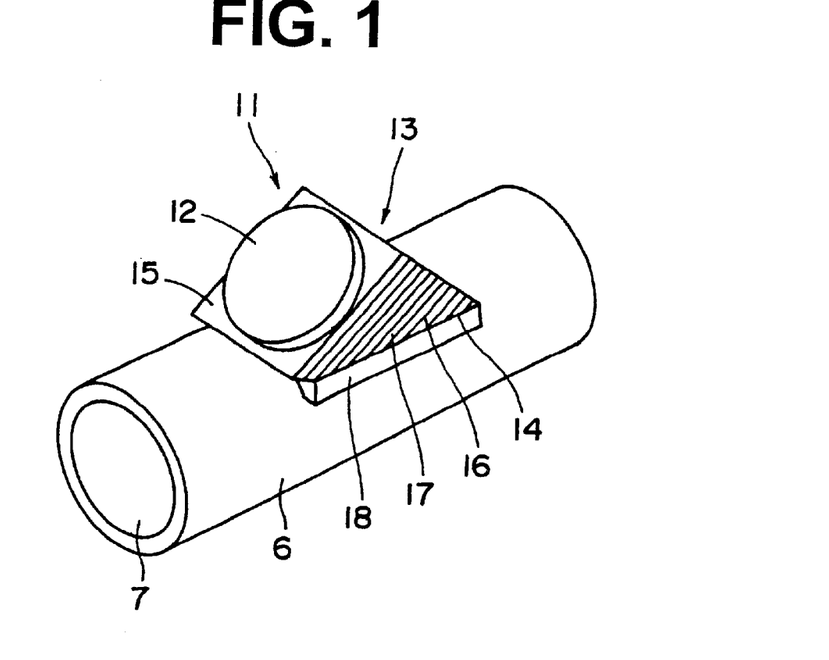
FIG. 1 is a schematic view of one ultrasonic transmitting-receiving device according to the invention.

FIG. 1 is a schematic view of one ultrasonic transmitting-receiving device according to the invention. In FIG. 1, a ultrasonic transmitting-receiving device 11 is composed of a ultrasonic transducer 12 and a ultrasonic propagating element in a wedge form 13. The ultrasonic propagating element 13 has a bottom surface 14 and a slanting surface 15 extending from one edge of the bottom surface 14 at an acute angle. The ultrasonic transducer 12 is attached on the slanting surface 15. The ultrasonic transducer 12 has an electrode (not shown) and a lead line (not shown) on the side facing the propagating element as well as on another side. The combination of the electrode and lead line serves to apply electric voltage to the transducer 12.

The ultrasonic propagating element 13 is composed of a plurality of sheet units in which each sheet unit is composed of plural high modulus fibers 16 aligned in parallel in resinous material 17, so as to propagate the ultrasonic wave emitted by the ultrasonic transducer 12 onto the bottom surface 14 at an angle perpendicular to the slanting surface 15 (corresponding to a vibrating surface of the ultrasonic transducer 12).

The high sensitivity of the flowmeter provided by making the ultrasonic transmitting-receiving device of fiber-reinforced resinous material can be explained as follows.

(1) The high modulus fibers aligned in parallel to each other on the slanting surface of the ultrasonic propagating element (corresponding to the vibrating surface of the ultrasonic transducer) prohibit diffusion of ultrasonic wave along the vibrating surface of the ultrasonic transducer, while assist the ultrasonic wave to predominantly advance in the direction perpendicular to the vibrating surface of the ultrasonic transducer. Accordingly, the directivity of the ultrasonic wave transmitted by the ultrasonic transducer is enhanced, and the sensitivity of the flowmeter is improved.

(2) Generally, when ultrasonic wave (longitudinal wave) propagates within solid material, a portion of the ultrasonic wave is converted into a traverse wave. The ultrasonic propagating element of fiber-reinforced resinous material contains, along the ultrasonic wave propagating route perpendicular to the slanting surface (corresponding to the vibrating surface of the ultrasonic transducer), resinous portions 17 between the highly aligned high modulus fibers. A portion of the propagating ultrasonic wave may be converted into a traverse wave. However, the high modulus fibers around the resinous portions prohibit diffusion of the traverse wave generated in the resinous portions. In other words, the well aligned high modulus fibers keep the generated traverse wave from diffusing in the propagating element.

There are no specific limitations on the direction of alignment of the high modulus fibers 16, so long as the fibers are aligned in parallel to the slanting surface 15 of the ultrasonic propagating element 13 (corresponding to the vibrating surface of the ultrasonic transducer 12). Preferably, the ultrasonic propagating element is produced by combining a plurality of sheets units in thickness direction in which plural high modulus fibers are aligned in parallel to each other are embedded in resinous material along the sheet plane.

The sheet units of the ultrasonic propagating element are preferably produced under the condition that the high modulus fibers in one sheet unit are arranged to make a right angle with the high modulus fibers in an adjoining sheet unit. A block of fiber-reinforced resinous material produced under the above-mentioned conditions is commercially available. Accordingly, the ultrasonic propagating element can be produced by appropriately cutting the commercially available fiber-reinforced resinous material block.

The high modulus fiber preferably has a tensile modulus of higher than 50 GPa, more preferably 100 GPa or higher. Examples of the high modulus fibers include carbon fiber, silicon carbide fiber, polyamide fiber, and aramide fiber.

Examples of the resinous materials for the production of the fiber-reinforced resinous material include epoxy resin, polyamide resin, polyimide resin, polyetherether ketone (PEEK) resin, phenol resin, unsaturated polyester resin, polycarbonate resin, and polyamideimide resin. Preferred is epoxy resin.

If a space (containing air) is present between the ultrasonic propagating element 13 and a pipe 6, the ultrasonic wave is reflected on the interface between the propagating element and air. This is because the impedance of air is low, as compared with the that of the propagating element. Therefore, contact material (i.e., buffer materia) is preferably inserted between the ultrasonic propagating element and the pipe for removing the air from the space between the propagating element and the pipe surface. The insertion of the contact material can be made by the steps of coating the contact material on the outer surface of the pipe and placing the ultrasonic transmitting-receiving device on the coated contact material under pressure. Examples of the contact materials include liquid or paste from which air bubbles are easily removed, for instance, water, oil, water glass, grease, and vaseline. Grease is preferred, when the ultrasonic transmitting-receiving device is permanently attached to the pipe surface to constantly measure the flow rate.

The bottom surface 14 of the ultrasonic propagating element 13 is preferably made to have a concave or U-shaped surface so as to have tight contact with the outer surface of the pipe 6. However, since it is not easy to process a surface of a commercially available fiber-reinforced resinous material to have an appropriate concave or U-shape, an elastic sheet 18 is preferably attached to the surface of the propagating element 13. The attached elastic sheet 18 serves to fix the ultrasonic transmitting-receiving device 11 stably onto the outer surface of the pipe 6, and further serves to easily adjust the position of the device 11 on the pipe 6. The elastic sheet is preferably made of elastic material having a rate of sonic propagation in the range of 1,000 to 2,000 m/sec. The elastic sheet can be made of solid material (elastic material) such as resin and metal. However, the elastic sheet is preferably made of elastic gel material, because the gel material is easily deformed to have close contact with the pipe. The elastic gel material can be soft elastomer. Examples of the elastic gel materials include silicone gel, polyurethane gel and polyurethane elastomer. The polyurethane gel is preferred.

Figure 2:
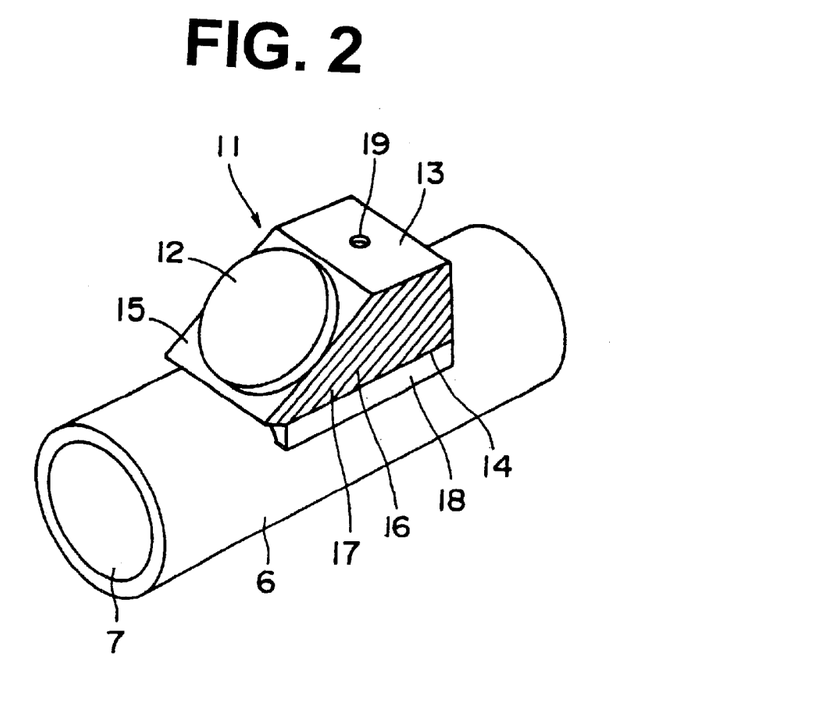
FIG. 2 is a schematic view of another ultrasonic transmitting-receiving device according to the invention.

The ultrasonic transmitting-receiving device of the invention is further explained by referring to FIG. 2 in which another embodiment of the ultrasonic transmitting-receiving device of the invention is schematically illustrated. The ultrasonic transmitting-receiving device 11 of FIG. 2 is the same as that of FIG. 1, except that the device has a different figure. So long as the function of propagating the ultrasonic wave in the direction perpendicular to the slanting surface on which the ultrasonic transducer is placed is concerned, the figure of the ultrasonic transmitting-receiving device of FIG. 1 is satisfactory. However, if the ultrasonic transmitting-receiving device has a upper plane surface, a bolt hole 19 for fixing the device to the pipe surface can be provided on the plane surface. A more detailed description on the fixation is set forth hereinafter.

Figure 3:
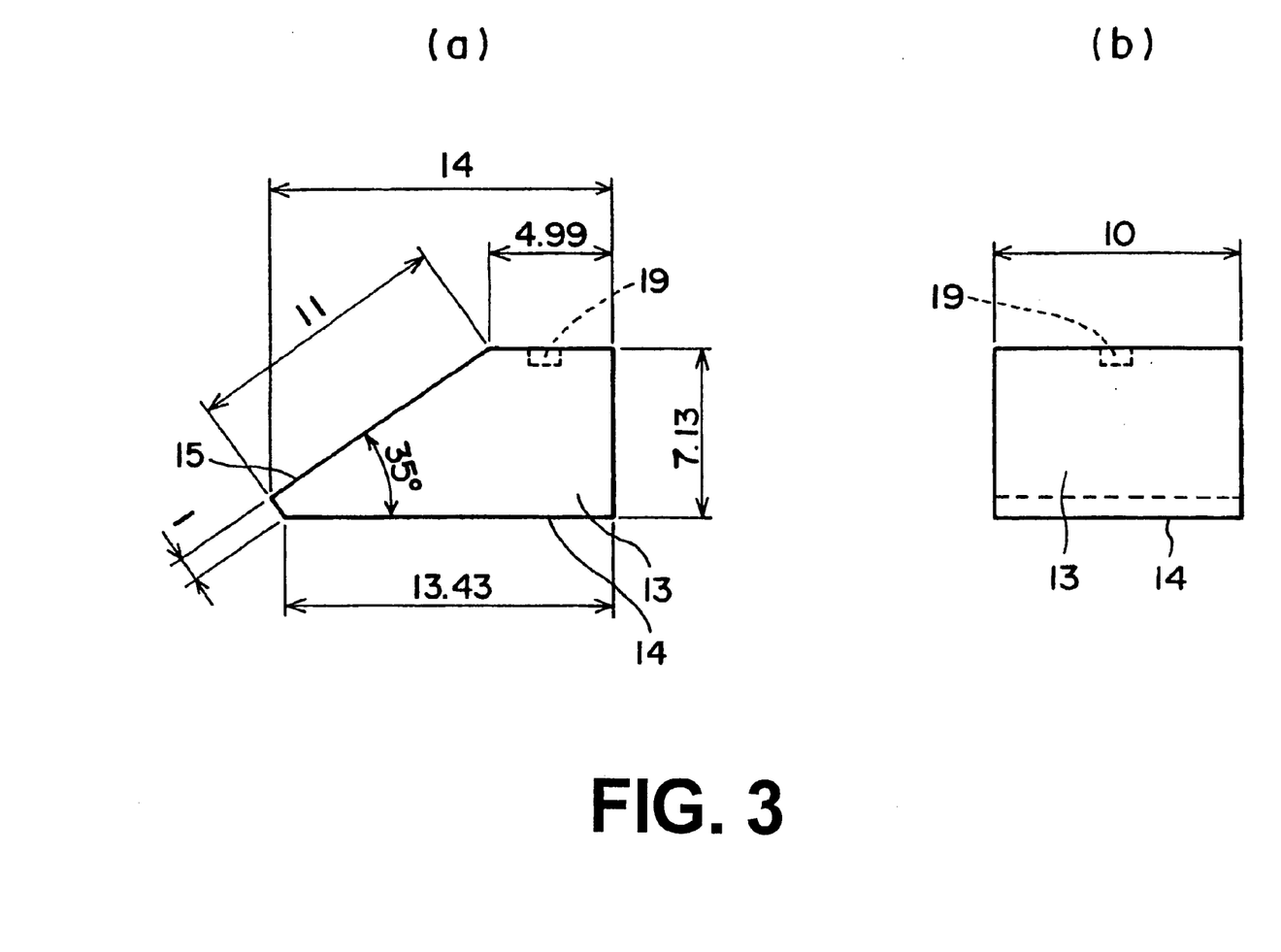

Typical sizes (in terms of mm) of the ultrasonic transmitting-receiving device in the wedge form 13 are given in FIG. 3. FIG. 3-(a) is a side view of the ultrasonic transmitting-receiving device 13, and FIG. 3-(b) is another side view of the transmitting-receiving device 13.

As described hereinbefore, the clamp-on ultrasonic flowmeter is generally classified into that utilizing a difference of propagating rate and that utilizing Doppler effect. Further, there are clamp-on ultrasonic flowmeters of different types. Details of the prior art clamp-on ultrasonic flowmeters are described in "Measurement of Flow Rate, A to B", Chapter 8 (Society of Japanese Measuring Device Industries, 1995).

Figure 4:
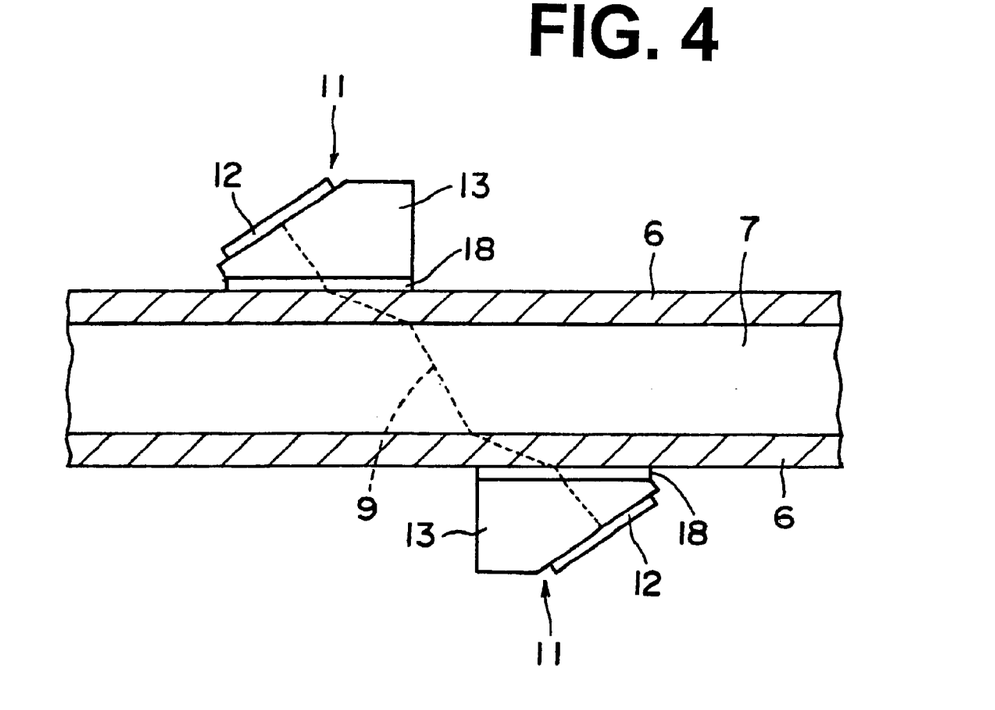
FIG. 4 shows a section of a clamp-on ultrasonic flowmeter which is formulated by a pair of the ultrasonic transmitting-receiving device of the invention in the Z-mode.
Figure 5:
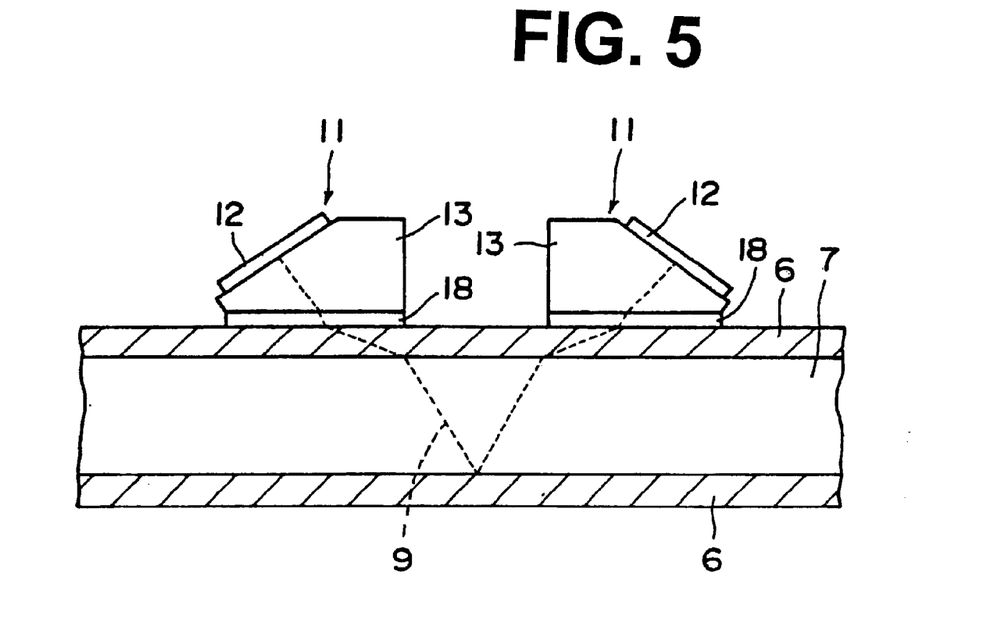
FIG. 5 shows a section of a clamp-on ultrasonic flowmeter which is formulated by a pair of the ultrasonic transmitting-receiving device of the invention in the V-mode.

The ultrasonic transmitting-receiving device can be arranged in a Z-mode or a V-mode to give a ultrasonic flowmeter. A representative arrangement of the Z-mode is illustrated in FIG. 4. A representative arrangement of the V-mode is illustrated in FIG. 5. The names of Z-mode and V-mode are given in view of the figures of propagating routes of the ultrasonic wave 19 in the passing fluid 7.

The V-mode is advantageous, because it gives a totally long passage (which gives a relatively high sensitivity), as compared with the total passage given by the Z-mode. Moreover, a pair of the ultrasonic transmitting-receiving devices are easily attached to the outer surface of the pipe 6 in the V-mode arrangement.

The clamp-on ultrasonic flowmeter of the invention is further described below in more detail.

Figure 6:
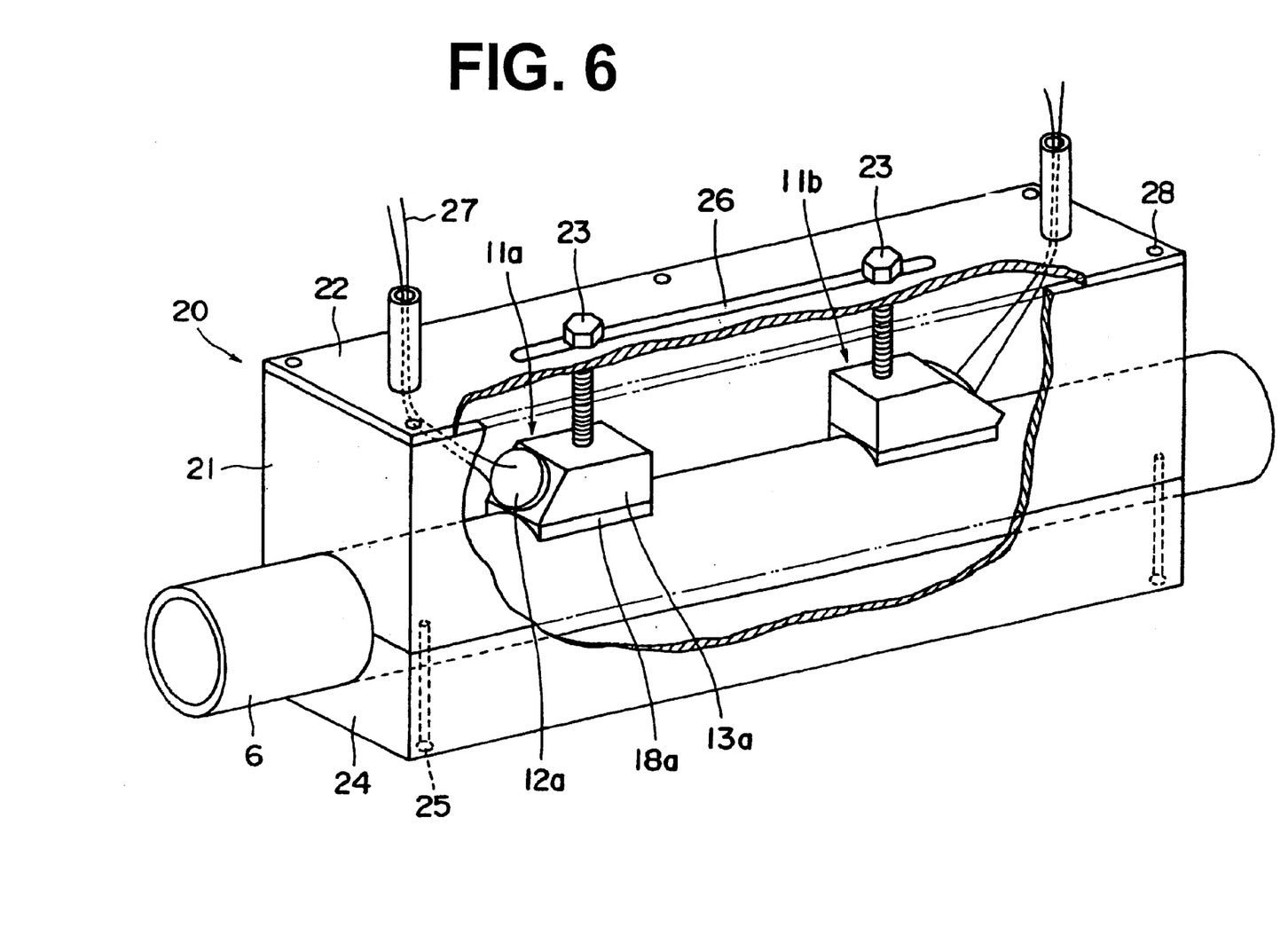
FIG. 6 is a partially cutaway schematic view of a clamp-on ultrasonic flowmeter according to the invention.

FIG. 6 is a partially cutaway schematic view of a clamp-on ultrasonic flowmeter according to the invention.

The clamp-on ultrasonic flowmeter of the invention practically comprises a pair of the ultrasonic transmitting-receiving devices of the invention and means for fixing the transmitting-receiving devices onto the pipe (or tube). For instance, a pair of the ultrasonic transmitting-receiving devices 11a, 11b are linearly arranged within a long case 20 having opening on its bottom and optionally on a cover plate 22 under the condition that the slanting surfaces on each of which the ultrasonic transducer is attached do not face each other, as illustrated in FIG. 6. The long case 20 comprises a casing body 21 and the cover plate 22. The cover plate 22 having an opening 26 is fixed to the casing body 21 by means of screws 28. An electric line 30 is attached.

If the sizes of the pipe (i.e., inner diameter and outer diameter) and nature of the pipe material are previously known, an appropriate distance between the ultrasonic transmitting-receiving devices 11a, 11b can be calculated separately. Accordingly, the devices 11a, 11b can be previously fixed in the long case at an appropriate space using the upper opening 26 and a pair of bolts 23. A clamp-on ultrasonic flowmeter comprising the long case 20 in which a pair of the ultrasonic transmitting-receiving devices are fixed at a predetermined space is easily set to various pipes of chemical plants or other pipe system.

The fixation of the flowmeter to a pipe is easily and reliably accomplished by placing the pipe 6 between the case 20 and a flowmeter-fixing aid 24 and then combining the case 20 and the fixing aid 24 by means of screws 25. The fixing method is not limitative. For instance, the case 20 can be fixed to the pipe 20 using a rubber band.

If the sizes of the pipe (i.e., inner diameter and outer diameter) and nature of the pipe material are not known, the distance between the ultrasonic transmitting-receiving devices should be adjusted and determined in situ for each pipe system. The long opening 26 of FIG. 6 is advantageously provided for such adjustment of the distances between the transmitting-receiving devices.

A rate of sonic wave propagation of the ultrasonic propagating element utilized in the clamp-on ultrasonic flowmeter of the invention typically is approximately 3,000 m/sec., in the direction perpendicular to the longitudinal direction of the high modulus fibers.

Figure 14:
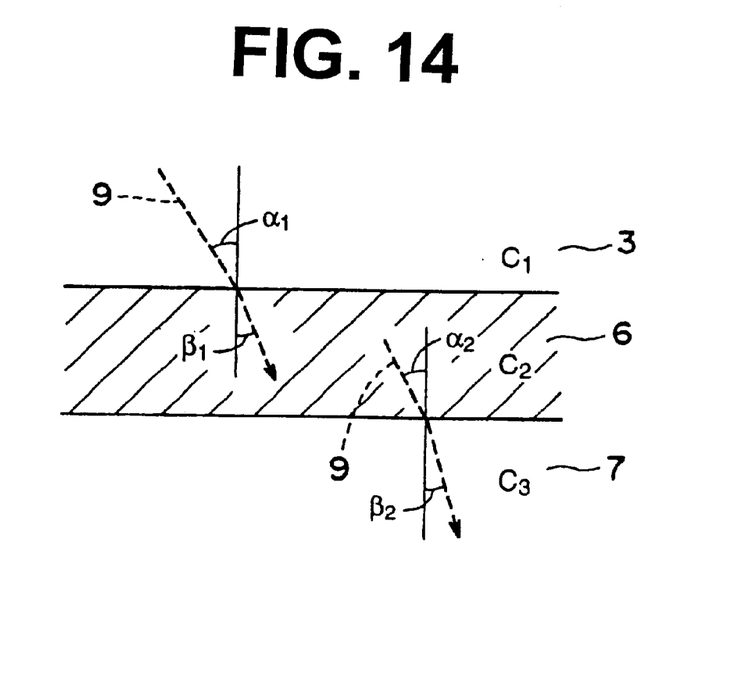
FIG. 14 explains the propagating routes of ultrasonic wave in the pipe wall at the outer surface and inner surface.

When a ultrasonic wave 9 is propagated from the ultrasonic propagating element in the wedge form 3 to the pipe wall 6, the relationship of the following equation (I) is produced on the outer surface of the pipe wall 6. See FIG. 14.

$$\mathrm{Sin}\ \alpha_1/\mathrm{Sin}\ \beta_1 = C_1/C_2 \qquad (I)$$

In the equation (I), $C_1$ means a rate of sonic wave in the ultrasonic propagating element 3, $C_2$ means a rate of sonic wave in the pipe wall 6, $\alpha_1$ means an angle of incidence (from the normal), and $\beta_1$ means an angle of refraction (from the normal).

When a ultrasonic wave 9 is propagated from the pipe wall 6 to the fluid 7 passing within the pipe, the relationship of the following equation (II) is produced on the inner surface of the pipe wall 6.

$$\text{Sin } \alpha_2/\text{Sin } \beta_2 = C_2/C_3 \tag{II}$$

In the equation (II), $C_2$ has the same meaning as above, $C_3$ means a rate of sonic wave in the passing fluid 7, $\alpha_2$ means an angle of incidence (from the normal), and $\beta_2$ means an angle of refraction (from the normal).

If the difference of rate of sonic wave between the ultrasonic propagating element and the pipe wall is small, the angle of refraction ($\beta_2$) can be enlarged (almost up to the angle of incidence $\alpha_2$) by setting the angle of incidence $\alpha_1$ at a large value, and therefore the passage of the ultrasonic wave in the passing fluid can be prolonged. If the passage of the ultrasonic wave in the passing fluid is prolonged, a flow rate of a fluid passing in the pipe slowly can be measured with high sensitivity.

If the difference of rate of sonic wave between the ultrasonic propagating element and the pipe wall is large, the ultrasonic may be totally reflected on the interface between the propagating element and the pipe wall according to the Snell's Law, or the angle of refraction ($\beta_2$) is greatly reduced, as compared with the angle of incidence ($\alpha_1$). For instance, in the case of $C_1 < C_2$, the critical angle decreases, as the difference between $C_1$ and $C_2$ increases. Accordingly, if the angle of incidence ($\alpha_1$) is set at a large value, the ultrasonic wave may be totally reflected on the outer surface of the pipe wall. In the case of $C_1 > C_2$, the total reflection does not occur. However, the angle of refraction ($\beta_2$) decreases, as compared with the angle of incidence ($\alpha_1$), if the difference between $C_1$ and $C_2$ increases. The decrease of angle of refraction ($\beta_2$) results in decrease of passage of ultrasonic wave in the passing fluid. Therefore, if the difference of rate of sonic propagation between the ultrasonic propagating element and the pipe wall is large, it is more difficult to design a flowmeter having high sensitivity, as compared with the case in that the difference of rate of sonic propagation between the ultrasonic propagating element and the pipe wall is small.

Accordingly, the clamp-on ultrasonic flowmeter of the invention is more favorably employable for measuring a flow rate of a fluid passing in a pipe or tube whose wall is made of material having a rate of sonic wave propagation similar to that of the ultrasonic propagating element of the invention. Preferred materials of the pipe wall are metal (such as iron, specifically stainless steel having a rate of sonic wave propagation of approx. 5,000 m/sec.) and polyvinyl chloride resin having a rate of sonic wave propagation of approx. 2,200 m/sec. When a fluid passing within a pipe made of one of these materials is measured in its flow rate, the angle of the slanting surface to the bottom surface of the ultrasonic propagating element is preferably set to 25 to 45°.

In the above-mentioned explanation, the effect provided by the contact material and/or the elastic material sheet is not mentioned, for the sake of simplifying the explanation. For the actually employed flowmeter, however, the design and arrangement of the ultrasonic transmitting-receiving devices are adjusted in consideration of the presence of the contact material and/or the elastic material sheet. The adjustment and arrangement can be easily performed utilizing the Snell's Law.

The clamp-on ultrasonic flowmeter of the invention can be manufactured in the form of a combination of a pipe element having a joint at each end and the clamp-on ultrasonic flowmeter attached to the pipe element. The ultrasonic flowmeter of this structure can be placed in a pipe system in place of a detachable pipe element. This replacement system is favorably employed in the case that the pipe system contains a detachable pipe element.

The present invention is further described by the following examples.

COMPARISON EXAMPLE 1

Prior Art

A commercially available clamp-on ultrasonic flowmeter (supplied by Tokyo Keiso Co., Ltd) was attached to a stainless steel pipe (outer diameter: 34 mm) in the V-mode. The attachment of a pair of the ultrasonic transmitting-receiving devices onto the pipe surface was made using grease. In the pipe, water was passed. To the ultrasonic transducer of the ultrasonic transmitting-receiving device on the transmitter side was applied a voltage pulse (pulse width: 0.5 $\mu$sec., pulse height: 30 V). A ultrasonic wave transmitted by the device on the transmitter side was received by the ultrasonic transmitting-receiving device on the receiver side after propagating through the pipe wall portions and passing fluid.

Figure 7:
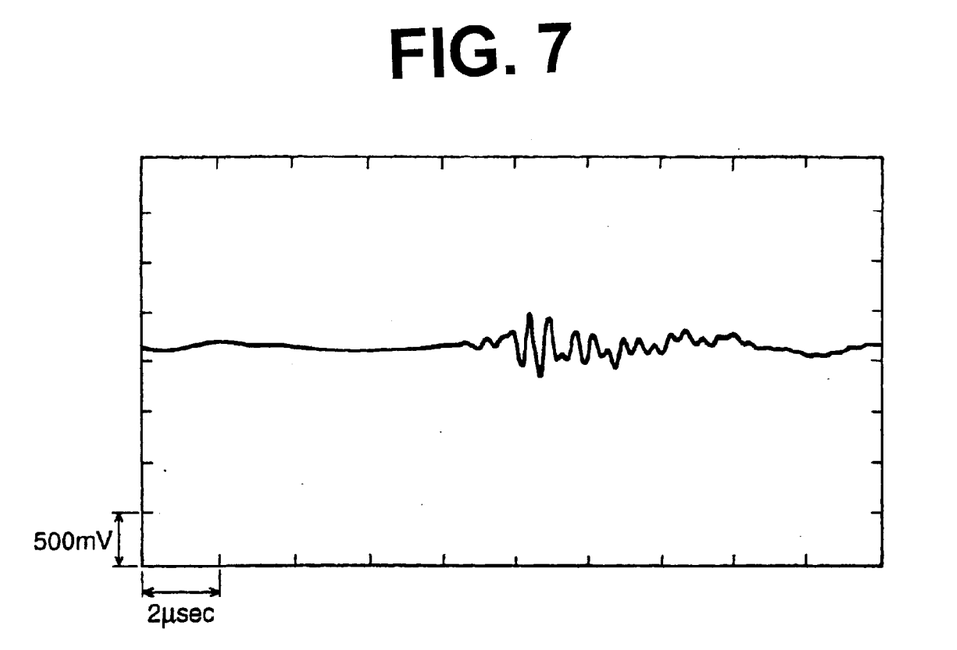
FIG. 7 indicates a waveform which is output from the ultrasonic receiving device in Comparison Example 1.

The waveform obtained in the receiver device is shown in FIG. 7. In FIG. 7, the time given is on the axis of abscissas, and the voltage is given on the axis of ordinates. The maximum amplitude of the voltage waveform obtained in the receiver device was 0.66 V.

EXAMPLE 1

A commercially available fiber-reinforced resinous material block (made of epoxy resin and carbon fibers having a tensile modulus in the longitudinal direction of 240 GPa) was cut to produce a ultrasonic propagating element in the wedge form illustrated in FIG. 2.

Independently, a two-pack polyurethane gel was molded and hardened at room temperature to give an elastic sheet illustrated in FIG. 2. The back face (opposite to the surface to be attached to the propagating element) was made to have a concave (or U-shaped) surface, so as to appropriately fix the elastomer sheet onto the surface of a pipe.

The elastomer sheet prepared above was attached to the bottom surface of the ultrasonic transmitting-receiving element, and a commercially available ultrasonic transducer (diameter: 10 mm, thickness: 1 mm, made of lead zirconate titanate, PZT) was attached onto the slanting surface of the element. Thus, a ultrasonic transmitting-receiving device having the constitution shown in FIG. 2 was produced.

The carbon fibers were aligned in parallel with the slanting surface, as is illustrated in FIG. 2. The angle of the slanting surface from the bottom surface was 35°, and the angle of incidence of the ultrasonic applied to the bottom surface was 55°.

The procedures of measurement of the flow rate of water passing within the pipe described in Comparison Example 1 were repeated using the pair of the ultrasonic transmitting-receiving devices produced above.

Figure 8:
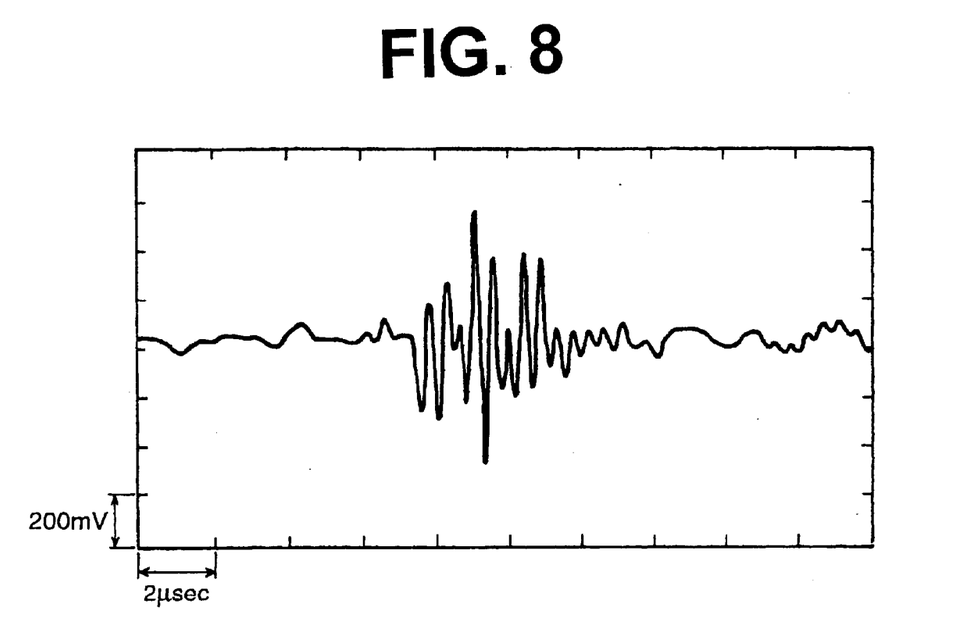
FIG. 8 indicates a waveform which is output from the ultrasonic receiving device in Example 1.

The waveform of the ultrasonic wave obtained in the transmitter device is shown in FIG. 8. In FIG. 8, the time given is on the axis of abscissas, and the voltage is given on the axis of ordinates. The maximum amplitude of the voltage waveform obtained in the receiver device was 1.04 V.

In summary, when the same voltage pulse was applied to the transducers of the ultrasonic transmitter devices of Comparison Example 1 and Example 1, the voltage collected from the ultrasonic transducer of the receiver device of the invention (Example 1) was more than 1.5 times as much as the voltage collected from the ultrasonic transducer of the prior art receiver device (Comparison Example 1). Accordingly, it is confirmed that the clamp-on ultrasonic flowmeter has prominently high sensitivity.

COMPARISON EXAMPLE 2

Prior Art

The procedures of measurement of the flow rate of water passing within the pipe described in Comparison Example 1 were repeated using a pipe made of polyvinyl chloride resin (outer diameter: one inch).

Figure 9:
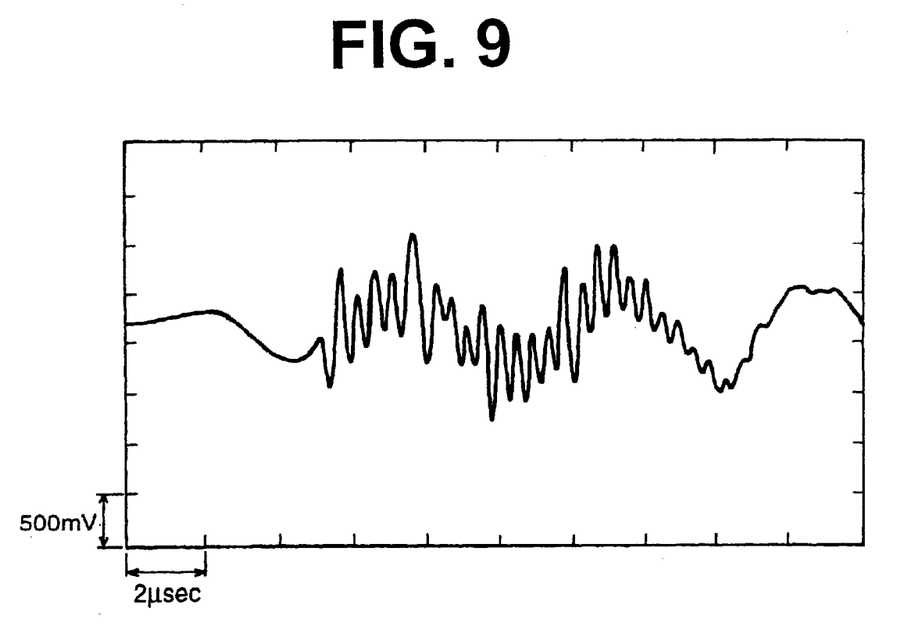
FIG. 9 indicates a waveform which is output from the ultrasonic receiving device in Comparison Example 2.

The waveform of the ultrasonic wave obtained in the transmitter device is shown in FIG. 9. In FIG. 9, the time given is on the axis of abscissas, and the voltage is given on the axis of ordinates. The maximum amplitude of the voltage waveform obtained in the receiver device was as high as 1.31 V. However, large meandering was observed in the voltage waveform. Such large meandering in the waveform disturbs to set correctly the threshold voltage value for determining the start point from which the receipt of the propagating ultrasonic wave is started. Therefore, an error is produced in detecting the period of time for the propagating time, and the measurement sensitivity decreases.

EXAMPLE 2

The procedures of measurement of the flow rate of water passing within the pipe described in Comparison Example 2 were repeated using the pair of the ultrasonic transmitting-receiving devices produced in Example 1.

Figure 10:
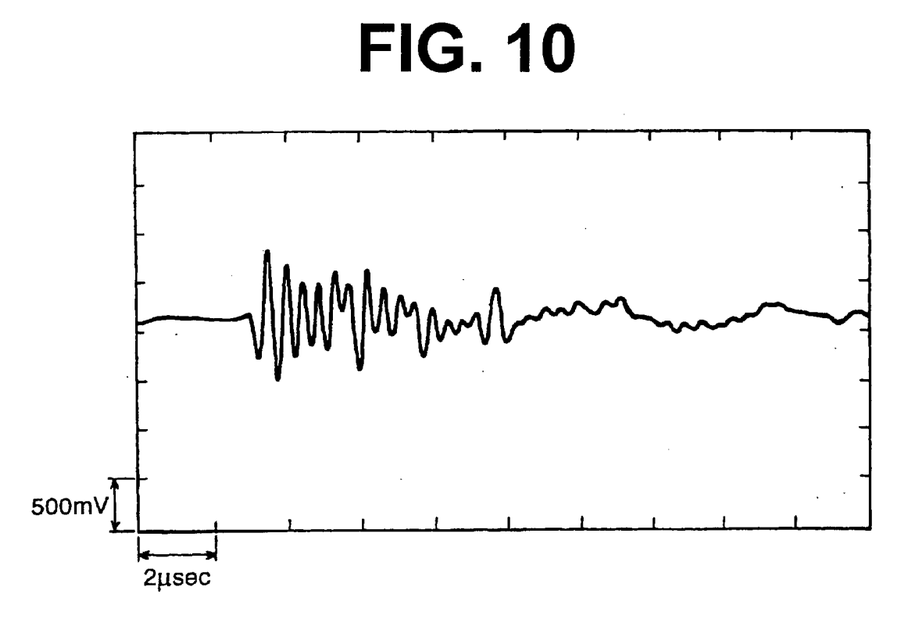
FIG. 10 indicates a waveform which is output from the ultrasonic receiving device in Example 2.

The waveform of the ultrasonic wave obtained in the transmitter device is shown in FIG. 10. In FIG. 10, the time given is on the axis of abscissas, and the voltage is given on the axis of ordinates. The maximum amplitude of the voltage waveform obtained in the receiver device was 1.29 V, which was almost equal to that observed in Comparison Example 2.

However, no large meandering such as that observed in the voltage wave form of Comparison Example 2 was observed in the voltage waveform obtained in this Example.

What is claimed is:

1. A clamp-on ultrasonic flowmeter comprising a pair of ultrasonic transmitting-receiving devices, each comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

2. The clamp-on ultrasonic flowmeter of claim 1, wherein the sheet units of the ultrasonic propagating element are produced under the condition that the high modulus fibers in one sheet unit are arranged to make a right angle with the high modulus fibers in an adjoining sheet unit.

3. The clamp-on ultrasonic flowmeter of claim 1, wherein the high modulus fiber has a tensile modulus of higher than 50 GPa.

4. The clamp-on ultrasonic flowmeter of claim 3, wherein the high modulus fiber is carbon fiber.

5. The clamp-on ultrasonic flowmeter of claim 1, wherein an elastic material sheet is attached to the bottom surface of the ultrasonic propagating element.

6. The clamp-on ultrasonic flowmeter of claim 5, wherein the elastic material sheet has a convex surface on the side not facing the propagating element.

7. The clamp-on ultrasonic flowmeter of claim 5, wherein the elastic material sheet has a rate of sonic wave propagation in the range of 1,000 to 2,000 m/sec.

8. The clamp-on ultrasonic flowmeter of claim 5, wherein the elastic material sheet is made of polyurethane gel.

9. The clamp-on ultrasonic flowmeter of claim 1, a pair of the ultrasonic transmitting-receiving devices are linearly arranged in a long case having opening on a bottom thereof under the condition that the slanting surfaces on each of which the ultrasonic transducer is attached do not face each other.

10. The clamp-on ultrasonic flowmeter of claim 9, the pair of the ultrasonic transmitting-receiving devices are arranged under the condition that each of the transmitting-receiving device is able to move on the opening to change a distance between the transmitting-receiving devices.

11. A flow rate-measuring structure comprising a pipe in which a fluid flows and a pair of ultrasonic transmitting-receiving devices arranged on the pipe on an outer surface thereof, each transmitting-receiving device comprising a ultrasonic propagating element in the form of wedge having a bottom surface and a slanting surface extending from one edge of the bottom surface at an acute angle, and a ultrasonic transducer provided on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

12. The flow rate-measuring structure of claim 11, wherein the pipe is made of metal.

13. The flow rate-measuring structure of claim 12, wherein the metal pipe is made of iron.

14. The flow rate-measuring structure of claim 11, wherein the pipe is made of polymeric material.

15. The flow rate-measuring structure of claim 14, wherein the pipe is made of polyvinyl chloride.

16. The flow rate-measuring structure of claim 11, wherein the sheet units of the ultrasonic propagating element are produced under the condition that the high modulus fibers in one sheet unit are arranged to make a right angle with the high modulus fibers in an adjoining sheet unit.

17. The flow rate-measuring structure of claim 11, wherein the high modulus fiber has a tensile modulus of higher than 50 GPa.

18. The flow rate-measuring structure of claim 17, wherein the high modulus fiber is carbon fiber.

19. The flow rate-measuring structure of claim 11, wherein an elastic material sheet is attached to the bottom surface of the ultrasonic propagating element.

20. The flow rate-measuring structure of claim 19, wherein the elastic material sheet has a convex surface on the side not facing the propagating element.

21. The flow rate-measuring structure of claim 19, wherein the elastic material sheet has a rate of sonic wave propagation in the range of 1,000 to 2,000 m/sec.

22. The flow rate-measuring structure of claim 19, wherein the elastic material sheet is made of polyurethane gel.

23. A ultrasonic transmitting-receiving device comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element is composed of a plurality of sheet units in which each sheet unit is composed of plural high modulus fibers aligned in parallel in resinous material, so as to propagate ultrasonic wave emitted by the ultrasonic transducer onto the bottom surface at an angle perpendicular to the slanting surface.

24. The ultrasonic transmitting-receiving device of claim 23, wherein the sheet units of the ultrasonic propagating element are produced under the condition that the high modulus fibers in one sheet unit are arranged to make a right angle with the high modulus fibers in an adjoining sheet unit.

25. The ultrasonic transmitting-receiving device of claim 23, wherein the high modulus fiber has a tensile modulus of higher than 50 GPa.

26. The ultrasonic transmitting-receiving device of claim 25, wherein the high modulus fiber is carbon fiber.

27. The ultrasonic transmitting-receiving device of claim 23, wherein an elastic material sheet is attached to the bottom surface of the ultrasonic propagating element.

* * * * *